United States Patent
Koseoglu

(10) Patent No.: US 11,590,485 B2
(45) Date of Patent: Feb. 28, 2023

(54) PROCESS FOR MODIFYING A HYDROPROCESSING CATALYST

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 169 days.

(21) Appl. No.: 17/147,682

(22) Filed: Jan. 13, 2021

(65) Prior Publication Data

US 2022/0219159 A1 Jul. 14, 2022

(51) Int. Cl.

| | | |
|---|---|---|
| *B01J 37/20* | (2006.01) | |
| *B01J 21/04* | (2006.01) | |
| *B01J 21/06* | (2006.01) | |
| *B01J 23/883* | (2006.01) | |
| *B01J 29/08* | (2006.01) | |
| *C10G 47/12* | (2006.01) | |
| *C10G 47/20* | (2006.01) | |

(52) U.S. Cl.
CPC .............. *B01J 37/20* (2013.01); *B01J 21/04* (2013.01); *B01J 21/06* (2013.01); *B01J 23/883* (2013.01); *B01J 29/084* (2013.01); *C10G 47/12* (2013.01); *C10G 47/20* (2013.01); *C10G 2300/705* (2013.01)

(58) Field of Classification Search
CPC . B01J 21/04; B01J 21/06; B01J 23/883; B01J 29/084; B01J 29/166; B01J 37/16; B01J 37/20; C10G 45/02; C10G 45/04; C10G 47/12; C10G 47/20; C10G 2300/703; C10G 2300/705
See application file for complete search history.

(56) References Cited

U.S. PATENT DOCUMENTS

| | | | |
|---|---|---|---|
| 3,140,994 | A | 7/1964 | Derr, Jr. et al. |
| 3,770,617 | A | 11/1973 | Riley et al. |
| 3,948,763 | A | 4/1976 | Christman et al. |
| 4,725,569 | A | 2/1988 | Tuszynski et al. |
| 4,943,547 | A | 7/1990 | Seamans et al. |
| 5,157,201 | A | 10/1992 | Norris |
| 7,154,016 | B2 | 12/2006 | Heller et al. |
| 7,513,990 | B2 | 4/2009 | Guillaume et al. |
| 7,648,941 | B2 | 1/2010 | Soled et al. |
| 7,686,943 | B2 | 3/2010 | Soled et al. |
| 7,803,735 | B2 | 9/2010 | Maesen et al. |
| 7,807,599 | B2 | 10/2010 | Maesen et al. |
| 7,816,298 | B2 | 10/2010 | Maesen et al. |
| 7,838,696 | B2 | 11/2010 | Maesen et al. |
| 7,846,869 | B2 | 12/2010 | LaCour |
| 7,910,761 | B2 | 3/2011 | Maesen et al. |
| 7,988,848 | B2 | 8/2011 | Brignac et al. |
| 8,163,169 | B2 | 4/2012 | Maesen et al. |
| 8,173,570 | B2 | 5/2012 | Maesen et al. |
| 8,206,575 | B2 | 6/2012 | Maesen et al. |
| 8,242,321 | B2 | 8/2012 | Boldingh et al. |
| 8,242,322 | B2 | 8/2012 | Boldingh |
| 8,343,887 | B2 | 1/2013 | Maesen et al. |
| 8,350,112 | B2 | 1/2013 | Boldingh et al. |
| 8,350,113 | B2 | 1/2013 | Boldingh |
| 8,372,776 | B2 | 2/2013 | Mironov et al. |
| 8,389,433 | B2 | 3/2013 | Mironov et al. |
| 8,420,565 | B2 | 4/2013 | Mironov et al. |
| 8,431,511 | B2 | 4/2013 | Mironov et al. |
| 8,481,795 | B2 | 7/2013 | Boldingh et al. |
| 8,702,970 | B2 | 4/2014 | Maesen et al. |
| 8,722,563 | B2 | 5/2014 | Soled et al. |
| 8,722,564 | B2 | 5/2014 | Soled et al. |
| 8,747,659 | B2 | 6/2014 | Kiss et al. |
| 8,864,980 | B2 | 10/2014 | Kiss et al. |
| 9,169,449 | B2 | 10/2015 | Reynolds et al. |
| 9,199,224 | B2 | 12/2015 | Han et al. |
| 9,205,413 | B2 | 12/2015 | Han et al. |
| 9,206,361 | B2 | 12/2015 | Chabot et al. |
| 9,266,098 | B2 | 2/2016 | Han et al. |
| 9,272,254 | B2 | 3/2016 | Robinson et al. |
| 9,272,276 | B2 | 3/2016 | Robinson et al. |
| 9,327,274 | B2 | 5/2016 | Han et al. |
| 9,327,275 | B2 | 5/2016 | Han et al. |
| 9,399,836 | B2 | 7/2016 | Powell et al. |
| 9,399,837 | B2 | 7/2016 | Powell et al. |
| 9,404,044 | B2 | 8/2016 | Powell et al. |
| 9,404,217 | B2 | 8/2016 | Powell et al. |
| 9,415,385 | B2 | 8/2016 | Helton et al. |

(Continued)

FOREIGN PATENT DOCUMENTS

WO 2015066563 A1 5/2015

OTHER PUBLICATIONS

Notification of Transmittal of the International Search Report and Written Opinion of the International Searching Authority, or the Declaration dated Apr. 19, 2022 pertaining to International application No. PCT/US2022/011016 filed Jan. 3, 2022, pp. 1-12.

*Primary Examiner* — Brian A McCaig

(74) *Attorney, Agent, or Firm* — Dinsmore & Shohl LLP

(57) ABSTRACT

Embodiments of the present disclosure are directed to a process for modifying catalysts comprising introducing a precursor agent and hydrogen gas to a conversion reactor; contacting the precursor agent with a conversion catalyst in the conversion reactor, thereby producing an active agent; introducing the active agent to a production reactor; and contacting the active agent with a hydroprocessing catalyst in the production reactor, thereby producing a modified hydroprocessing catalyst.

19 Claims, No Drawings

(56) References Cited

U.S. PATENT DOCUMENTS

| | | |
|---|---|---|
| 9,422,494 B2 | 8/2016 | Bradin |
| 9,446,436 B2 | 9/2016 | Powell et al. |
| 9,458,247 B2 | 10/2016 | Powell et al. |
| 9,468,950 B2 | 10/2016 | Powell et al. |
| 9,470,059 B2 | 10/2016 | Zhou |
| 9,492,851 B2 | 11/2016 | Powell et al. |
| 9,504,993 B2 | 11/2016 | Han et al. |
| 9,562,160 B2 | 2/2017 | Powell et al. |
| 9,580,602 B2 | 2/2017 | Powell et al. |
| 9,593,242 B2 | 3/2017 | Powell et al. |
| 9,593,388 B2 | 3/2017 | Powell et al. |
| 9,593,448 B2 | 3/2017 | Powell et al. |
| 9,604,188 B2 | 3/2017 | Powell |
| 9,604,189 B2 | 3/2017 | Powell |
| 9,605,085 B2 | 3/2017 | Chheda et al. |
| 9,644,151 B2 | 5/2017 | Powell et al. |
| 9,644,152 B2 | 5/2017 | Boon et al. |
| 9,650,574 B2 | 5/2017 | Felix et al. |
| 9,708,763 B2 | 7/2017 | Powell et al. |
| 9,708,764 B2 | 7/2017 | Powell et al. |
| 9,732,469 B2 | 8/2017 | Powell et al. |
| 9,758,842 B2 | 9/2017 | Powell et al. |
| 9,770,712 B2 | 9/2017 | Robinson et al. |
| 9,776,181 B2 | 10/2017 | Kuperman et al. |
| 9,783,740 B2 | 10/2017 | Powell et al. |
| 9,790,432 B2 | 10/2017 | Powell et al. |
| 9,790,436 B2 | 10/2017 | Powell et al. |
| 9,797,022 B2 | 10/2017 | Powell et al. |
| 9,822,048 B2 | 11/2017 | Boon et al. |
| 9,919,987 B1 | 3/2018 | Zhan et al. |
| 9,938,466 B2 | 4/2018 | Linck et al. |
| 9,943,835 B2 | 4/2018 | Dufresne et al. |
| 9,995,108 B2 | 6/2018 | Allen et al. |
| 10,022,712 B2 | 7/2018 | Soled et al. |
| 10,081,011 B2 | 9/2018 | Robinson et al. |
| 10,150,921 B2 | 12/2018 | Johnson et al. |
| 10,167,243 B2 | 1/2019 | Powell et al. |
| 10,167,430 B2 | 1/2019 | Hart et al. |
| 10,221,362 B2 | 3/2019 | Johnson et al. |
| 10,226,766 B2 | 3/2019 | Kijlstra et al. |
| 10,286,373 B2 | 5/2019 | Wene et al. |
| 10,369,558 B2 | 8/2019 | Yu et al. |
| 10,370,600 B2 | 8/2019 | Yu et al. |
| 10,376,873 B2 | 8/2019 | Yu et al. |
| 10,569,265 B2 | 2/2020 | Robinson et al. |
| 10,584,289 B2 | 3/2020 | Sunkara et al. |
| 10,597,592 B2 | 3/2020 | Kandel et al. |
| 10,603,657 B2 | 3/2020 | Ding et al. |
| 10,604,709 B2 | 3/2020 | Moore et al. |
| 10,610,854 B2 | 4/2020 | Bhan |
| 10,619,105 B2 | 4/2020 | Felix et al. |
| 10,632,453 B2 | 4/2020 | Bai et al. |
| 10,643,839 B2 | 5/2020 | Suzuki et al. |
| 10,655,074 B2 | 5/2020 | Moore et al. |
| 10,669,490 B2 | 6/2020 | Dindi |
| 10,669,491 B2 | 6/2020 | McCarthy et al. |
| 10,669,498 B1 | 6/2020 | Azad |
| 10,682,632 B2 | 6/2020 | Miller et al. |
| 10,688,479 B2 | 6/2020 | Miller et al. |
| 10,689,926 B2 | 6/2020 | Zhou |
| 10,704,001 B2 | 7/2020 | Kar et al. |
| 10,717,687 B2 | 7/2020 | Abhari et al. |
| 10,731,085 B2 | 8/2020 | Lindberg et al. |
| 10,731,091 B2 | 8/2020 | Mukherjee et al. |
| 10,737,245 B2 | 8/2020 | Miller et al. |
| 10,737,246 B2 | 8/2020 | Miller et al. |
| 10,737,248 B2 | 8/2020 | Miller et al. |
| 10,737,249 B2 | 8/2020 | Miller et al. |
| 10,744,491 B2 | 8/2020 | Miller et al. |
| 10,760,014 B2 | 9/2020 | Kumar et al. |
| 10,773,245 B2 | 9/2020 | Miller et al. |
| 10,774,414 B2 | 9/2020 | Magdinier et al. |
| 10,780,396 B2 | 9/2020 | Huston et al. |
| 10,787,619 B2 | 9/2020 | Subramaniyam |
| 10,799,857 B2 | 10/2020 | Do et al. |
| 10,800,718 B2 | 10/2020 | Detjen et al. |
| 10,800,884 B2 | 10/2020 | Miyahara et al. |
| 10,800,976 B2 | 10/2020 | Myllyoja et al. |
| 10,808,179 B2 | 10/2020 | Qin et al. |
| 10,814,301 B2 | 10/2020 | Xu et al. |
| 10,814,302 B2 | 10/2020 | Xu et al. |
| 10,822,247 B2 | 11/2020 | Osman et al. |
| 10,822,545 B2 | 11/2020 | Urade et al. |
| 10,836,966 B2 | 11/2020 | Moore et al. |
| 10,843,176 B2 | 11/2020 | Osman et al. |
| 10,850,266 B2 | 12/2020 | White et al. |
| 10,857,526 B2 | 12/2020 | Miller et al. |
| 10,865,350 B2 | 12/2020 | Jimenez et al. |
| 10,875,013 B2 | 12/2020 | Miller et al. |
| 10,875,820 B2 | 12/2020 | Tijm et al. |
| 10,876,053 B2 | 12/2020 | Klussmann et al. |
| 10,882,030 B2 | 1/2021 | Miller et al. |
| 10,888,850 B2 | 1/2021 | Bai et al. |
| 10,894,754 B2 | 1/2021 | Ohler et al. |
| 10,894,924 B2 | 1/2021 | Coleman et al. |
| 10,898,885 B2 | 1/2021 | Ding et al. |
| 2006/0057056 A1* | 3/2006 | Chretien .................. C10L 3/12 422/171 |
| 2012/0116134 A1* | 5/2012 | Bozzano .................. C10L 1/02 585/240 |
| 2016/0121313 A1 | 5/2016 | Zhang et al. |
| 2016/0312125 A1* | 10/2016 | Linck ...................... C10G 3/42 |

* cited by examiner

PROCESS FOR MODIFYING A HYDROPROCESSING CATALYST

TECHNICAL FIELD

The present disclosure relates to the modification of catalysts and more specifically, to the pretreatment of hydroprocessing catalysts.

BACKGROUND

Hydroprocessing involves contacting a hydrocarbon feed with a hydroprocessing catalyst, in the presence of hydrogen. Hydroprocessing catalysts generally include active metals supported on alumina. These active metals are deposited in their oxide form and must be converted to their sulfide form before they can catalyze hydrodesulphurization (HDS), hydrodenitrification (HDN), hydrocracking (HCR), and hydrodemetallization (HDM) reactions.

Traditionally, catalyst sulfiding is carried out in-situ (in the reactor) by injecting a liquid sulfide precursor into a production catalyst bed in combination with hydrogen and a hydrocarbon feed. The liquid sulfide precursor and sulfur in the hydrocarbon feed are converted in situ to $H_2S$ gas. The $H_2S$ gas can then convert the oxide form of the active metals into their sulfide form. While pure $H_2S$ gas can be used if it is readily available in the refinery, it is often not available at the required purity and concentration. Accordingly, dimethyl disulfide (DMDS) is the most commonly used option in refineries.

Liquid sulfide precursors may include contaminants such as sodium and potassium. Additionally, there are inexpensive sulfide precursors, the use of which would be desirable if they did not contain relatively high levels of contaminants. For example, disulfide oil (DSO) is an inexpensive sulfide precursor which is not frequently used due to relatively high levels of contaminants including sodium, potassium, carbon, nitrogen, water, iron, mercury, phosphorus, and vanadium. As the sulfide precursors are converted to a gaseous sulfide, the contaminants initially present in the liquid may remain as residue on the surface of the hydroprocessing catalyst, poisoning the catalyst.

Some hydroprocessing catalysts, such as those comprising zeolite, may become too active following the sulfiding step. This excess activity may result in temperature excursions after introduction of the hydrocarbon feed. The excess activity is normally controlled through a process known as nitrogen or ammonia passivation. In the passivation process, ammonia compounds are injected into the reactor. The ammonia adsorbs onto the acidic sites of the catalyst and poisons these sites. Once the cracking bed is appropriately treated with ammonia, hydrocarbon feed can be introduced to the unit without the risk of temperature excursions. Ammonia passivation can also change selectivity of the catalysts.

However, liquid ammonia precursors are generally preferred relative to pure ammonia because handling ammonia can be expensive. Leaks or spills can lead to serious health and safety issues. Ammonia can also damage pumps and valves. Therefore, injection of nitrogen containing organic agents is generally preferred, relative to ammonia. These organic compounds react with hydrogen over the hydroprocessing catalyst to form the ammonia needed to passivate the catalyst. Similar to the sulfiding precursors, ammonia precursors may also contain contaminants which may be left on the surface of the catalyst as the ammonia is formed. These contaminants may cause catalyst activity issues.

The conventional processes for the modification of hydroprocessing catalysts, such as sulfiding and ammonia deactivation require direct contact between liquid precursors of the sulfiding/ammonia agents and the hydroprocessing catalysts. This contact can result in contaminants present in the liquid precursors being deposited on the surface of the hydroprocessing catalysts, causing premature deactivation.

SUMMARY

Accordingly, new processes are desired to produce modified hydroprocessing catalysts. Processes which do not require direct contacting of liquid precursor agents with the hydroprocessing catalysts. Embodiments of the present disclosure meet this need by providing processes and apparatuses which convert hydroprocessing catalysts to modified hydroprocessing catalysts using gaseous agents. Specifically, embodiments meet this need by converting liquid precursor agents to gaseous active agents in a conversion reactor and then contacting the hydroprocessing catalysts with the gaseous active agents.

According to the subject matter of the present disclosure, a process for modifying catalysts may comprise introducing a precursor agent to a conversion reactor; contacting the precursor agent with a conversion catalyst in the conversion reactor, thereby producing an active agent; introducing the active agent to a production reactor; and contacting the active agent with a hydroprocessing catalyst in the production reactor, thereby producing a modified hydroprocessing catalyst.

Although the concepts of the present disclosure are described herein with primary reference to the sulfiding of hydroprocessing catalysts, it is contemplated that the concepts will enjoy applicability to any modification of hydroprocessing catalysts.

ABBREVIATIONS $m^3$=cubic meters.
kg=kilogram.
$kg/m^3$=kilograms per cubic meter.
DMDS=dimethyl disulfide.
wt. %=weight percent.
$MoO_3$=molybdenum trioxide.
CoO=cobalt oxide.
$H_2S$=hydrogen sulfide.
Mol.=mole.
° C.=degrees Celsius.
° C./hr.=degrees Celsius per hour.
Min.=minutes.
Sec.=seconds.
Hr.=hours.
Ppm=parts per million weight.
Bpsd=barrels per stream day.

DETAILED DESCRIPTION

Traditionally, modification of hydroprocessing catalysts has been plagued by contamination from the residues of liquid precursor agents. Thus, relatively expensive liquid precursor agents which have minimal levels of contaminants are required. Accordingly, processes which can enable the use of less pure (and therefore less expensive) liquid modification precursors are desired.

According to the subject matter of the present disclosure, a process for modifying hydroprocessing catalysts may comprise introducing a precursor agent to a conversion reactor; contacting the precursor agent with a conversion catalyst in the conversion reactor, thereby producing an active agent; introducing the active agent to a production reactor; and contacting the active agent with a hydroprocessing catalyst in the production reactor, thereby producing a modified hydroprocessing catalyst.

As used herein, a "conversion reactor" may be any reactor configured to convert a precursor agent into an active agent. The conversion reactor may be positioned upstream of the production reactor. The conversion reactor may be part of a system structurally configured to transport the active agent from the conversion reactor to the production reactor. The conversion reactor may not be the same reactor as the production reactor.

The conversion reactor may be any reactor configured to convert a precursor agent into an active agent. For example, the conversion reactor may be a fixed bed reactor, a moving bed reactor, an ebullated-bed reactor or a fluidized bed reactor. A fixed-bed reactor may refer to a reactor in which the catalyst does not move during the catalytic reaction. A moving-bed reactor may refer to a reactor in which the catalyst is constantly flowing through the reactor along with the reactants. An ebullated-bed reactor may refer to a reactor in which the catalyst is suspended in the liquid reactants. A fluidized-bed reactor may refer to a reactor in which the catalyst is suspended in the reactant gas.

According to some embodiments, the conversion reactor may be separated from the production reactor such that it is capable of independent control. For example, the conversion reactor may be entirely separated from the production reactor except for a pipe or a series of pipes which connect them.

Pipes connecting the conversion reactor with the production reactor may include a device for removing contaminants from the active agent. For example, the device for removing contaminants from the active agent may comprise one or more of a filter, a scrubber, an absorber, a zeolite, a magnet, a liquid/gas separator, or a flow pattern designed to remove solids. According to alternate embodiments, the pipes connecting the conversion reactor with the production reactor may not have a device for removing contaminants. Without being limited by theory, it is believed that any contaminants will be deposited on the conversion catalyst and thus will not be present in the active agent.

A precursor agent may be introduced to a conversion reactor. The precursor agent may be introduced to the conversion reactor through a pipe, inlet, valve, or other controllable inlet. The precursor agent may be introduced to the conversion reactor with the aid of a pump.

The precursor agent may be introduced to the conversion reactor as a liquid. Alternatively, the precursor agent may be introduced to the conversion reactor as a vapor. Without being limited by theory, it is believed that the use of liquid precursor agents is preferred to the use of gaseous (precursor or active) agents because liquids tend to be easier to store and transport. Liquids are easier to store and transport due to their increased density and the fact that they often do not require a pressure vessel.

Hydrogen gas may be introduced into the conversion reactor. The hydrogen gas may be introduced into the conversion reactor with the precursor agent at a hydrogen: precursor agent mol. ratio of from 1:1 to 10:1. For example, the ratio of hydrogen:precursor agent mol. ratio may be from 1:1 to 8:1, from 1:1 to 6:1, from 1:1 to 4:1, from 1:1 to 2:1, from 2:1 to 10:1, from 2:1 to 8:1, from 2:1 to 6:1, from 2:1 to 4:1, from 4:1 to 10:1, or any subset thereof.

Without being limited by theory, it is believed that hydrogen gas may be necessary to convert some precursor agents into their respective active agents. For example, it is believed that when a carbon-sulfur bond is broken, one hydrogen atom is added to the hydrocarbons and one hydrogen atom is added to the sulfur. Thus, two additional hydrogen atoms are required per carbon-sulfur bond.

The precursor agent may contact the conversion catalyst in the conversion reactor, thereby producing an active agent. The choice of conversion catalyst may depend upon the precursor agent required. The produced active agent may be in a gaseous form.

The precursor agent may contact the conversion catalyst at a conversion temperature. The conversion temperature may be sufficient to cause the precursor agent to convert to the active agent over a given conversion catalyst. For example, the precursor agent may contact the conversion catalyst at a conversion temperature of from 150° C. to 300° C., from 200° C. to 300° C., from 150° C. to 250° C., from 200° C. to 250° C., from 210° C. to 240° C., from 220° C. to 230° C., or any subset thereof.

The precursor agent may contact the conversion catalyst at a pressure of from 1 bar to 100 bar. For example, the precursor agent may contact the conversion catalyst at a pressure of from 1 bar to 80 bar, 1 bar to 60 bar, 1 bar to 50 bar, 1 bar to 40 bar, 10 bar to 100 bar, 10 bar to 80 bar, 10 bar to 60 bar, 10 bar to 40 bar, 20 bar to 100 bar, 20 bar to 80 bar, 20 bar to 60 bar, 20 bar to 40 bar, or any subset thereof.

The precursor agent may contact the conversion catalyst for a contact time sufficient to cause the precursor agent to fully convert to active agent. For example, the precursor agent may have a residence time in the conversion reactor of from 1 sec to 1 hr., 15 sec. to 1 hr., 30 sec. to 1 hr., 1 min. to 1 hr., 10 min. to 1 hr., 20 min. to 1 hr., 30 min. to 1 hr., 1 sec. to 30 min., 1 sec. to 10 min., 1 sec. to 1 min., 30 sec. to 1 hr., 1 min. to 30 min., or any subset thereof.

The precursor agent may continue to be introduced into the conversion reactor after break-through is achieved for the conversion reactor. As used herein "break-through" may refer to the point at which the concentration of active agent in the gas exiting the reactor reaches 5,000 ppm. Without being limited by theory, it is believed that prior to break-through, very little active agent will be seen in the gas exiting the production reactor since the hydroprocessing catalysts are consuming nearly all of the active agent prior to break-through. Break-through is understood to be a signal that substantially all of the catalyst has been converted from the original form to the modified form. It is believed that after breakthrough, minimal further changes occur in the catalyst bed with continued exposure to active agents. It is thus believed that the concentration of active agent flowing from the conversion reactor to the production reactor will greatly increase once break-through is achieved in the conversion reactor.

The active agent may be passed from the conversion reactor to the production reactor. For example, the active agent may be passed from the conversion reactor to the production reactor through a pipe or duct.

The active agent may be introduced to a production reactor. The active agent may be introduced from the conversion reactor to the production reactor by a pipe. The active agent may be introduced to the production reactor using a valve or other metering device.

The production reactor may comprise any reactor configured to conduct a hydroprocessing reaction. The production reactor may comprise a fixed-bed catalyst reactor, a moving-bed catalyst reactor, an ebullated-bed reactor or a fluidized-bed reactor.

Introducing the active agent into the production reactor may further comprise one or more of pumping, compressing, heating, or cooling the active agent. For example, introducing the active agent into the production reactor may comprise pumping the active agent. In alternate embodiments, the active agent may flow from the conversion reactor to the production reactor due to a pressure gradient between the conversion reactor and the production reactor.

The active agent may be introduced to the production reactor as a gas. Without being limited by theory, it is believed that the most significant contaminants present in the precursor agent will be left behind as a residue during the decomposition of the precursor agent. Thus, introducing the active agent to the production reactor may help to prevent contaminants in the precursor agent from entering the production reactor and contaminating the hydroprocessing catalyst.

Precursor agents may have a higher level of contamination than would be preferred if they were directly exposed to the hydroprocessing catalyst. Therefore, a combined weight of all contaminants in the precursor agent may be at least 1 ppm. For example, the combined weight of all contaminants may be at least 10 ppm, at least 100 ppm, at least 1000 ppm, at least 10000 ppm, or even at least 100000 ppm. The contaminants may include one or more of sodium, potassium, carbon, nitrogen, water, iron, mercury, phosphorus, and vanadium.

The active agent may contact the hydroprocessing catalyst in the production reactor and thereby produce a modified hydroprocessing catalyst. According to some embodiments, such as those where the hydroprocessing catalyst is converted to a sulfided form, the modified hydroprocessing catalyst may be more active than the unsulfided hydroprocessing catalyst. According to alternative embodiments, such as those where the hydroprocessing catalyst is converted to ammonia form, the modified hydroprocessing catalyst may be less reactive than the hydroprocessing catalyst.

The active agent may contact the hydroprocessing catalyst at a modification temperature sufficient to convert the hydroprocessing catalyst into the modified hydroprocessing catalyst. For example, the modification temperature may be from 150° C. to 300° C., 175° C. to 300° C., 200° C. to 300° C., 225° C. to 300° C., 150° C. to 275° C., 150° C. to 250° C., 150° C. to 225° C., 175° C. to 275° C., 175° C. to 250° C., 175° C. to 225° C., 200° C. to 275° C., 200° C. to 250° C., 200° C. to 225° C., or any subset thereof.

The active agent may contact the hydroprocessing catalyst at a modification pressure sufficient to convert the hydroprocessing catalyst into the modified hydroprocessing catalyst. For example the modification pressure may be from 50 bar to 100 bar, from 50 bar to 90 bar, from 60 bar to 100 bar, from 60 bar to 90 bar, from 70 bar to 80 bar, or any subset thereof.

The active agent may contact the hydroprocessing catalyst at an active agent partial pressure of 50 bar to 100 bar, from 50 bar to 90 bar, from 60 bar to 100 bar, from 60 bar to 90 bar, from 70 bar to 80 bar, or any subset thereof.

The active agent may contact the hydroprocessing catalyst until break-through is achieved for the production reactor. This may be achieved by introducing precursor agent into the conversion reactor until break-through is achieved for the production reactor. It should be understood that the conversion reactor and the production reactor may reach break-through at different times.

In general it is necessary to alter the activity of the hydroprocessing catalyst by contacting the hydroprocessing catalyst with the active agent, to form the modified hydroprocessing catalyst. The activity of the hydroprocessing catalyst may be increased by contacting the hydroprocessing catalyst with a sulfide molecule in a process known as "sulfiding." Some hydroprocessing catalysts possess high activity or may become highly active after sulfiding, especially hydroprocessing catalysts which comprise a zeolite. In such cases, the activity of the hydroprocessing catalyst may be decreased by contacting the hydroprocessing catalyst with an ammonia compound in a process known as "ammonia passivation."

According to embodiments where the active agent comprises a sulfide, the active agent may be introduced into the production reactor such that the molar ratio of active agent: active metals is greater than 1:1. For example, the molar ratio of active agent:active metals may be from 1:1 to 4:1, from 2:1 to 4:1, from 3:1 to 4:1, from 1:1 to 3:1, from 1:1 to 2:1, or any subset thereof.

According to some embodiments, the active agent may comprise a sulfide, such as hydrogen sulfide. The active agent may comprise at least 50 wt. %, at least 75 wt. %, at least 90 wt. %, at least 99 wt. %, or even at least 99.9 wt. % of hydrogen sulfide.

The precursor agent may comprise a sulfide precursor. The sulfide precursor may comprise any chemical which includes a sulfur atom and is capable of being converted into a gas which comprises sulfur. Without being limited by theory, it may be preferable to use a liquid sulfide precursor rather than a gaseous sulfide because liquid sulfide precursors may have improved handling properties relative to gaseous sulfides.

The sulfide precursor may comprise one or more organic monosulfides or polysulfides or an oxide thereof. For example, the organic polysulfides may comprise one or more dialkyl-polysulfides with a formula R—$S_n$—R', wherein R and R' are carbon chains with from 1 to 20 carbon atoms. For example, the sulfide precursor may comprise one or more of tertiary-butyl polysulfide (BPS, dimethyl disulfide (DMDS). The sulfide precursor may comprise one or more of thiophenes, mercaptans, dialkyl disulfides, and diaryl disulfides. The sulfide precursor may comprise one or more of carbon disulfide, DMDS, disulfide oil (DSO), dimethyl sulfide, diethylsulfide dimethysulfoxide, n-butyl-mercaptan, di tertiary butyl poly sulfide, or di tertiary nonyl poly sulfide. According to some embodiments, the sulfide precursor may comprise dimethyl sulfoxide (DMSO).

The precursor agent may be any hydrocarbon fraction which comprises sulfur. For example, the hydrocarbon fraction may be kerosene. Kerosene may refer to hydrocarbon fractions boiling in the 150° C. to 275° C. range. Kerosene may refer to hydrocarbon fractions with between 10 and 16 carbon atoms per molecule.

The sulfide precursor may be disulfide oil (DSO) or an oxide of disulfide oil. DSO may be a suitable sulfide precursor because of its extremely low cost and availability in many refinery environments. Without being limited by theory, it is believed that DSO may be a relatively ineffective sulfiding agent according to traditional methods because of its relatively high concentrations of contaminants. However, according to the present methods, the traditional disadvantages of DSO may not be as relevant since the disadvantages of DSO only effect the conversion reactor and not the production reactor.

DSO may be produced by a mercaptan oxidation (MEROX) process in a refinery. In a MEROX process, light hydrocarbon fractions (such as liquid petroleum gas (LPG), $C_3$-$C_4$, light naphtha, heavy naphtha, and kerosene) are treated to convert mercaptans to metal thiolates and then to disulfide oil. A full description of a MEROX process can be found in U.S. Pat. Appl. No. 2020/0181073 A1.

The sulfide precursor may comprise less than 100 ppm nitrogen. For example, the sulfide precursor may comprise less than 80 ppm, less than 60 ppm, less than 40 ppm, less than 20 ppm, or even less than 10 ppm nitrogen.

The precursor conversion catalyst may comprise a sulfide conversion catalyst. The sulfide conversion catalyst may comprise any catalyst suitable to convert a sulfide precursor into a gaseous sulfide, such as H$_2$S. For example, the precursor conversion catalyst may comprise one or more of Co, Mo, Ni, W, and alumina. The alumina may be in the form of amorphous alumina, zeolite, or silica-alumina. The precursor conversion catalyst may have the same composition as the hydroprocessing catalyst. Alternatively, the precursor conversion catalyst may have a different composition from the hydroprocessing catalyst. According to some specific embodiments, the sulfide conversion catalyst may comprise Co—Mo.

According to some embodiments, the active agent may comprise a nitrogen compound. For example, the active agent may comprise ammonia. The active agent may comprise at least 1000 ppm ammonia. For example, the active agent may comprise from 1000 ppm to 100000 ppm, from 1000 ppm to 75000 ppm, from 1000 ppm to 50000 ppm, from 1000 ppm to 10000 ppm, from 1000 ppm to 5000 ppm, from 5000 ppm to 100000 ppm, from 5000 ppm to 75000 ppm, from 5000 ppm to 50000 ppm, from 5000 ppm to 10000 ppm, from 10000 ppm to 100000 ppm, from 10000 ppm to 75000 ppm, from 10000 ppm to 50000 ppm, from 50000 ppm to 100000 ppm, or any subset thereof.

The precursor agent may comprise an ammonia precursor. The ammonia precursor may comprise any chemical which includes a nitrogen atom and is capable of being converted into a gas which comprises ammonia. It may be preferable to use an ammonia precursor rather than ammonia because the use of gaseous ammonia may require specialized hardware.

According to some embodiments, the conversion catalyst may have been sulfided prior to the ammonia passivation. According to alternate embodiments, the conversion catalyst may not have been sulfided prior to exposure to an ammonia passivation process.

The precursor agent may comprise an ammonia precursor. For example, the ammonia precursor may comprise an organic molecule which comprises nitrogen. The organic molecule comprising nitrogen may be one or both of amines and aniline. For example, the ammonia precursor may comprise one or more primary amines, secondary amines, tertiary amines, diamines, polyamines, alkylamines, arylamines, arylalkylamines, aniline, methylaniline, dimethylaniline, diphenylamine, and triphenylamine. According to some embodiments, the ammonia precursor may comprise one or both of alkylamines and ethanolamines. Ethanolamines may comprise one or more of N-methyldiethanolamine (MDEA), N-methylethanolamine (MAE), triethanolamine (TEA), 3-diethylamino-propylamine (DEAPA), N,N-dimethyldipropylenetriamine (DMAPAPA), tri-n-butylamine (TNBA), hexadecylamine (HDA), and oleylamine (OL, octa-9-decenylamine).

The precursor conversion catalyst may comprise an ammonia conversion catalyst. The ammonia conversion catalyst may comprise any catalyst suitable to convert an ammonia precursor to an ammonia gas. For example, the precursor conversion catalyst may comprise one or more of Co, Mo, Ni, W, and alumina. The alumina may be in the form of amorphous alumina, zeolite, or silica-alumina. The ammonia conversion catalyst may have the same composition as the hydroprocessing catalyst. Alternatively, the ammonia conversion catalyst may have a different composition from the hydroprocessing catalyst. According to some embodiments, the precursor conversion catalyst may comprise Ni and Mo or Ni and W.

Hydrogen gas may be introduced to into the production reactor. The hydrogen gas may be introduced into the production reactor with the active agent at a hydrogen:active agent ratio of greater than 1:1. For example, the ratio of hydrogen:active agent may be from 1:1 to 4:1, from 1:1 to 3:1, from 1:1 to 2:1, from 2:1 to 4:1, or any subset thereof.

Without being limited by theory, it is believed that hydrogen gas may be necessary to convert some of the hydroprocessing catalysts of the present disclosure into their respective modified forms. Additional hydrogen may increase the conversion rate and alter the equilibrium constant for the conversion of hydroprocessing catalysts into modified hydroprocessing catalysts.

As is shown in reactions (I)-(IV) below, not all common hydroprocessing catalysts and active agents together contain enough hydrogen to carry out the reactions which convert the hydroprocessing catalysts to their modified form. Thus, additional hydrogen may be required to achieve full conversion of all hydroprocessing catalyst molecules to modified hydroprocessing catalyst molecules. Additional hydrogen may also increase the conversion rate and alter the equilibrium constant for the conversion of hydroprocessing catalysts to their modified form.

$$MoO_3 + 2H_2S + H_2 \rightarrow MoS_2 + 3H_2O \tag{I}$$

$$9CoO + 8H_2S + H_2 \rightarrow 9Co_9S_8 + 9H_2O \tag{II}$$

$$3NiO + 2H_2S + H_2 \rightarrow Ni_3S_2 + 3H_2O \tag{III}$$

$$WO_3 + 2H_2S + H_2 \rightarrow WS_2 + H_2O \tag{IV}$$

According to some embodiments, the hydroprocessing catalyst may be a hydrocracking catalyst. According to other embodiments, the hydroprocessing catalyst may be a hydrotreating catalyst or a residue hydroprocessing catalyst. The hydroprocessing catalyst may be any catalyst suitable for catalyzing a hydrodesulphurization (HDS) reaction, a hydrocracking reaction, a hydrodemetallization reaction, or a hydrodenitrification (HDN) reaction.

The hydroprocessing catalyst may comprise alumina, silica-alumina, zeolite, or a combination thereof. The alumina may comprise amorphous alumina. The silica-alumina may comprise amorphous silica alumina. The alumina, silica-alumina, zeolite, or combination thereof may comprise a support for active metals.

The hydroprocessing catalyst may comprise one or more active metals selected from the group of Mo, W, Co, and Ni. The active metals may be in their oxide form or their sulfide form.

According to embodiments where the modification of the hydroprocessing catalyst is sulfiding, at least 50 wt. %, at least 60 wt. %, at least 70 wt. %, at least 80 wt. %, at least 90 wt. %, or even at least 99 wt. % of the active metals of the hydroprocessing catalyst may be in oxide form before being exposed to the sulfide gas. For example, the oxide form of Mo may be MoO$_3$, Co may be CoO, Ni may be NiO, and W may be WO$_3$.

According to embodiments where the modification of the hydroprocessing catalyst is sulfiding, at least 50 wt. %, at least 60 wt. %, at least 70 wt. %, at least 80 wt. %, at least 90 wt. %, at least 99 wt. %, or even at least 99.9 wt. % of the active metals of the modified hydroprocessing catalyst may be in sulfide form. For example, the sulfide form of Mo may be $MoS_2$, Co may be $Co_9S_8$, Ni may be $Ni_3S_2$, and W may be $WS_2$.

According to embodiments where the modification of the hydroprocessing catalyst is ammonia passivation, at least 50 wt. %, at least 60 wt. %, at least 70 wt. %, at least 80 wt. %, at least 90 wt. %, at least 99 wt. %, or even at least 99.9 wt. % of the active metals of the hydroprocessing catalyst may be in sulfide form before being exposed to the ammonia gas. For example, the sulfide form of Mo may be $MoS_2$, Co may be $Co_9S_8$, Ni may be $Ni_3S_2$, and W may be $WS_2$.

According to some embodiments, both sulfiding and ammonia passivation may be required. Ammonia passivation may occur after sulfiding. Accordingly, the precursor agent may comprise a sulfide precursor. The process may further comprise introducing an ammonia precursor to the conversion reactor, introducing hydrogen gas into the conversion reactor, and contacting the ammonia precursor with the conversion catalyst in the conversion reactor, thereby producing an ammonia gas. The ammonia gas may then be introduced into the production reactor and contact the modified hydroprocessing catalyst in the production reactor, thereby producing a sulfided and passivated hydroprocessing catalyst. The ammonia precursor may be introduced to the conversion reactor as a liquid and the ammonia gas may be introduced to the production reactor as a gas.

The sulfided and passivated hydroprocessing catalyst may comprise active metals and sulfur atoms in a molar ratio. According to some embodiments, the active metal is molybdenum or tungsten or both, and the molar ratio of sulfur: active metal may be from 1.9:1 to 2.1:1. According to other embodiments, the active metal may be nickel and the molar ratio of sulfur:nickel may be from 1.9:3 to 2.1:3. According to still other embodiments, the active metal may be cobalt and the molar ratio of sulfur:cobalt may be from 7.5:9 to 8.5:9.

One or both of the hydroprocessing catalyst and the conversion catalyst may be dried before being heated. Without being limited by theory, it is believed that if the catalysts are not dried before being heated to their respective conversion temperature and modification temperatures, the catalysts may explode from the buildup of steam within the catalyst pores. Additionally, it is believed that the catalyst should be dry for optimal accessibility of the the metal sites.

The hydroprocessing catalyst may be dried before exposing the hydroprocessing catalyst to an active agent. For example, the hydroprocessing catalyst may be dried before exposing the hydroprocessing catalyst to a hydrocarbon feedstock. Drying the hydroprocessing catalyst may comprise heating the hydroprocessing catalyst to a drying temperature, for a drying time. The drying temperature may be from 80° C. to 150° C., from 90° C. to 150° C., from 100° C. to 150° C., from 80° C. to 140° C., from 90° C. to 140° C., from 100° C. to 140° C., or any subset thereof. The drying time may be at least 1 hour, at least 2 hours, at least 4 hours, at least 8 hours, or any subset thereof.

The conversion catalyst may be dried before exposing the conversion catalyst to a precursor agent. For example, the conversion catalyst may be dried before exposing the conversion catalyst to a hydrocarbon feedstock. Drying the conversion catalyst may comprise heating the conversion catalyst to a drying temperature, for a drying time. The drying temperature may be from 80° C. to 150° C., from 90° C. to 150° C., from 100° C. to 150° C., from 80° C. to 140° C., from 90° C. to 140° C., from 100° C. to 140° C., or any subset thereof. The drying time may be at least 1 hour, at least 2 hours, at least 4 hours, at least 8 hours, or any subset thereof.

A hydrocarbon feedstock may be introduced into the conversion reactor, into the production reactor, or both. Within the conversion reactor, the hydrocarbon feedstock may contact the conversion catalyst. Within the production reactor, the hydrocarbon feedstock may contact the hydroprocessing catalyst. Contacting the catalyst with the hydrocarbon feedstock prior to the introduction of an active agent may be known as pre-wetting. Pre-wetting may be used in sulfiding or ammonia passivation processes. According to some embodiments, sulfiding or ammonia passivation processes may take place without pre-wetting. According to still other embodiments, sulfiding or ammonia passivation may take place after pre-wetting of the conversion catalyst but not of the hydroprocessing catalyst. Without being limited by theory, pre-wetting may cause the hydrocarbon feedstock to wet the pores of the catalyst and is believed to result in an even distribution of active agent during the modification step.

The hydrocarbon feedstock may comprise any liquid hydrocarbon. Preferably, the hydrocarbon feedstock will be a "straight-run" feedstock. As used herein, a "straight-run" feedstock may refer to a feedstock which has not been subjected to a cracking step. Without being limited by theory, it is believed that cracked feedstock may comprise highly reactive olefinic compounds. The olefinic compounds may be converted to coke and may damage the catalyst if used during the pre-wetting step.

An outlet of the production reactor may be separated into a liquid effluent and a gaseous effluent. The liquid effluent may be a liquid and the gaseous effluent may be a gas at a temperature of 200° C. and the pressure in the production reactor. The gaseous effluent may comprise one or more of hydrocarbons, hydrogen gas, and active agent. The liquid effluent may comprise one or more of hydrocarbons and water.

At least a portion of the gaseous effluent may be recycled back to the production reactor. At least a portion of the gaseous effluent may be bled off or separated for other use. From 0 wt. % to 40 wt. % of the gaseous effluent may be recycled back to the production reactor. For example, from 0 wt. % to 30 wt. %, from 0 wt. % to 20 wt. %, from 0 wt. % to 10 wt. %, from 1 wt. % to 40 wt. %, from 1 wt. % to 30 wt. %, from 1 wt. % to 10 wt. %, from 10 wt. % to 40 wt. %, from 30 wt. % to 40 wt. %, or any subset thereof, of the gaseous effluent may be recycled back to the production reactor.

At least a portion of the liquid effluent may be recycled back to the production reactor. At least a portion of the liquid effluent may be bled off or separated for other use. From 10 wt. % to 50 wt. % of the liquid effluent may be recycled back to the production reactor. For example, from 10 wt. % to 40 wt. %, from 10 wt. % to 30 wt. %, from 10 wt. % to 20 wt. %, from 20 wt. % to 50 wt. %, from 20 wt. % to 40 wt. %, from 20 wt. % to 30 wt. %, from 30 wt. % to 50 wt. %, from 30 wt. % to 40 wt. %, from 40 wt. % to 50 wt. % or any subset thereof, of liquid effluent may be recycled back to the production reactor. According to alternate embodiments, none of the liquid effluent is recycled back to the production reactor.

The conversion catalyst may be removed from the conversion reactor without removing the modified hydroprocessing catalyst from the production reactor. Without being limited by theory, it may be preferable to remove only the conversion catalyst because the conversion catalyst may become deactivated by contaminants before the modified hydroprocessing catalyst needs to be exchanged.

A weight ratio of conversion catalyst:hydroprocessing catalyst may be from 1:1000 to 100:1000. For example, the weight ratio of conversion catalyst:hydroprocessing catalyst may be from 1:1000 to 80:1000, from 1:1000 to 60:1000, from 1:1000 to 20:1000, from 10:1000 to 100:1000, from 10:1000 to 80:1000, from 10:1000 to 60:1000, from 20:1000 to 100:1000, from 20:1000 to 80:1000, from 30:1000 to 100:1000, from 40:1000 to 100:1000, or any subset thereof.

A combined weight of all contaminants in the modified hydroprocessing catalyst may be less than 1 wt. % of a total weight of the modified hydroprocessing catalyst. For example, the combined weight of contaminants may be less than 0.5 wt. %, less than 0.1 wt. %, less than 0.01 wt. %, less than 0.001 wt. %, less than 0.0001 wt. %, or even less than 0.00001 wt. % of the total weight of the modified hydroprocessing catalyst The contaminants may include one or more of sodium, potassium, carbon, nitrogen, water, iron, mercury, phosphorus, and vanadium.

The process may further comprise contacting the modified hydroprocessing catalyst with a hydroprocessing substrate in a hydroprocessing process. A hydroprocessing substrate may refer to naphtha, kerosene, diesel, or vacuum gas oil. As used herein, naphtha refers to a crude oil distillate with a boiling point from 20° C. to 180° C. As used herein, "kerosene" refers to a petroleum fraction with a boiling point from 180° C. to 240° C. As used herein, "diesel" refers to a petroleum fraction with a boiling point from 240° C. to 370° C. As used herein, "vacuum gas oil" refers to a petroleum fraction with a boiling point from 370° C. to 565° C.

A hydroprocessing process may comprise hydrocracking or hydrotreating. Hydrocracking may comprise contacting the modified hydroprocessing catalyst with a hydroprocessing substrate and hydrogen at a pressure of from 65 bar to 200 bar and a temperature of from 400° C. to 500° C. Hydrotreating may comprise contacting the modified hydroprocessing catalyst with a hydroprocessing substrate and hydrogen at a pressure of from 30 bar to 130 bar and a temperature of from 300° C. to 450° C.

According to some embodiments, the hydroprocessing substrate does not contact the conversion catalyst. For example, the conversion catalyst may be removed from the conversion reactor after sufficient modification has been achieved in the hydroprocessing catalyst. Alternatively, the flow of hydroprocessing substrate to the production reactor may be routed around the conversion reactor, such as through the use of valves, after sufficient modification has been achieved in the hydroprocessing catalyst. Sufficient modification may be defined as reaching break-through or a predetermined amount of ammonia adsorption.

According to an aspect, either alone or in combination with any other aspect, a process for modifying hydroprocessing catalysts comprises: introducing a precursor agent to a conversion reactor; introducing hydrogen gas into the conversion reactor; contacting the precursor agent with a conversion catalyst in the conversion reactor, thereby producing an active agent; introducing the active agent to a production reactor; and contacting the active agent with a hydroprocessing catalyst in the production reactor, thereby producing a modified hydroprocessing catalyst; wherein: the precursor agent is introduced to the conversion reactor as a liquid, and the active agent is introduced to the production reactor as a gas.

According to a second aspect, either alone or in combination with any other aspect, the precursor agent comprises a sulfide precursor and the precursor conversion catalyst comprises a sulfide conversion catalyst.

According to a third aspect, either alone or in combination with any other aspect, the sulfide conversion catalyst comprises one or more of Co, Mo, W, Ni, and alumina.

According to a fourth aspect, either alone or in combination with any other aspect, the sulfide precursor comprises one or more organic monosulfides or polysulfides.

According to a fifth aspect, either alone or in combination with any other aspect, the precursor agent is disulfide oil (DSO).

According to a sixth aspect, either alone or in combination with any other aspect, the precursor agent comprises an ammonia precursor and the precursor conversion catalyst comprises an ammonia conversion catalyst.

According to a seventh aspect, either alone or in combination with any other aspect, the ammonia conversion catalyst comprises one or more of Co, Mo, W, Ni, and alumina.

According to an eighth aspect, either alone or in combination with any other aspect, the ammonia precursor comprises one or more organic compounds comprising nitrogen.

According to a ninth aspect, either alone or in combination with any other aspect, the conversion catalyst has not been sulfided.

According to a tenth aspect, either alone or in combination with any other aspect, the precursor agent comprises a sulfide precursor and the process further comprises: introducing an ammonia precursor to the conversion reactor; introducing hydrogen gas into the conversion reactor; contacting the ammonia precursor with the conversion catalyst in the conversion reactor, thereby producing an ammonia gas; introducing the ammonia gas to the production reactor; and contacting the ammonia gas with the modified hydroprocessing catalyst in the production reactor, thereby producing a sulfided and passivated hydroprocessing catalyst; wherein: the ammonia precursor is introduced to the conversion reactor as a liquid, and the ammonia gas is introduced to the production reactor as a gas.

According to an eleventh aspect, either alone or in combination with any other aspect, the process further comprises introducing hydrogen gas into the production reactor.

According to a twelfth aspect, either alone or in combination with any other aspect, the process further comprises introducing a hydrocarbon feedstock into the conversion reactor.

According to a thirteenth aspect, either alone or in combination with any other aspect, the process further comprises separating an outlet of the production reactor into a liquid effluent and a gaseous effluent.

According to a fourteenth aspect, either alone or in combination with any other aspect, the process further comprises recycling at least a portion of the gaseous effluent back to the production reactor.

According to a fifteenth aspect, either alone or in combination with any other aspect, the process further comprises recycling at least a portion of the liquid effluent back to the production reactor.

According to a sixteenth aspect, either alone or in combination with any other aspect, the hydroprocessing catalyst comprises alumina, silica-alumina, zeolite, or a combination thereof.

According to a seventeenth aspect, either alone or in combination with any other aspect, the hydroprocessing catalyst comprises one or more of Mo, W, Co, or Ni.

According to an eighteenth aspect, either alone or in combination with any other aspect, the process further comprises continuing to introduce precursor agent into the conversion reactor after break-through has been achieved in the conversion reactor.

According to a nineteenth aspect, either alone or in combination with any other aspect, a combined weight of all contaminants in the modified hydroprocessing catalyst is less than 1 wt. % of a total weight of the modified hydroprocessing catalyst.

According to a twentieth aspect, either alone or in combination with any other aspect, the process further comprises contacting the modified hydroprocessing catalyst with a hydroprocessing substrate in a hydroprocessing process, wherein the hydroprocessing substrate does not contact the conversion catalyst.

EXAMPLES

Comparative Example 1: Sulfiding with Dimethyl Disulfide (DMDS) in a Production Reactor 370 metric tons of pretreat and hydrocracking catalyst were loaded into the first stage of a hydrocracker. 56 volume % (vol. %) of the catalyst was a pretreat catalyst and 44 vol. % of the catalyst was a cracking catalyst. The pretreat catalyst was in a separate reactor upstream from and in series with the cracking catalyst.

Catalyst Drying: The atmosphere in the hydrocracker was flushed with hydrogen gas and the pressure was increased to 30 bar. The reactor inlet temperature was then increased from room temperature to 105° C. at a rate of 17 degrees Celsius per hour (° C./hr). Upon reaching 105° C., the ramp rate was lowered to 6° C./hr and heating continued until the hydrotreating catalyst peak temperature reached 135° C. The system pressure was then increased to 150 bar through the addition of hydrogen gas. Water accumulation was observed in both the cold and hot high pressure separators, indicating that the catalyst was being dried. The drying continued for 4 hours at 150 bar and at 135° C.

Catalyst Pre-wetting: After the catalyst drying process, the catalyst bed temperature was lowered from 135° C. to from 100° C. to 110° C. The catalyst bed temperature in the reactor was stabilized at 100° C. The system pressure was then lowered to 105 bar. The startup oil was a straight run diesel with a 95 wt. % point of 375° C., comprising 200 parts per million weight (ppm) nitrogen and 1 wt. % sulfur. The startup oil was combined with enough DMDS to make the total sulfur concentration 2 wt. % and the mixture was introduced to the reactor at a rate of 25,000 barrels per stream day (BPSD).

Catalyst Sulfiding: The reactor inlet temperature was then increased to 238° C. at a rate of 17° C./hr. Break-through was reached when 45,000 kg of DMDS was injected.

Inventive Example 1: Sulfiding with $H_2S$ Generated in a DMDS Conversion Reactor 370 metric tons of pretreat and hydrocracking catalyst were loaded into a hydrocracker. 56 vol. % of the catalyst was pretreat catalyst and 44 vol. % of the catalyst was cracking catalyst. The pretreat catalyst was Ni—Mo on alumina and the cracking catalyst was Ni—Mo on silica-alumina with 5 wt. % USY zeolite. An additional 1.5 m³ of Co—Mo/alumina conversion catalyst was loaded into the conversion reactor.

Catalyst Drying: The atmosphere in the hydrocracker was flushed with hydrogen gas and the pressure was increased to 30 bar. The reactor inlet temperature was then increased from room temperature to 105° C. at a rate of 17 degrees Celsius per hour (° C./hr). Upon reaching 105° C., the ramp rate was lowered to 6° C./hr and the heating continued until the hydrotreating catalyst peak temperature reached 135° C. The system pressure was then increased to 150 bar. Water accumulation was observed in both the cold and the hot high pressure separators, indicating that the catalyst was being dried. The drying continued for 4 hours at 150 bar and at 135° C.

Catalyst Pre-wetting: After the catalyst drying process, the catalyst bed temperature was lowered from 135° C. to from 100° C. to 110° C. The catalyst bed temperature in the reactor was stabilized at 100° C. The system pressure was then lowered to 105 bar. The startup oil was a straight run diesel with a 95 wt. % point of 375° C., comprising 200 parts per million weight (ppm) nitrogen and 1 wt. % sulfur. The startup oil was combined with enough DMDS to make the total sulfur concentration 2 wt. % and the mixture was introduced to the reactor at a rate of 25,000 barrels per stream day (BPSD).

The reactor inlet temperature was then increased from 110° C. to 238° C. at a rate of 17° C./hr.

Operation of DMDS conversion Reactor: DMDS and hydrogen were injected into the DMDS conversion reactor at a rate of 3,000 L/hr. together with hydrogen at a hydrogen: DMDS mol. ratio of 3:1. The DMDS conversion reactor had an internal diameter of 0.75 meters and height of 2 meters. The reactor was operated at 30 bar pressure and 220° C. DMDS was fully converted to hydrogen sulfide, producing 1134 L/hr of hydrogen sulfide. The produced gas mixture was fed to the commercial reactor to sulfide the catalyst. Break-through was reached when 45,000 kg of DMDS was injected.

It is also noted that recitations herein of "at least one" component, element, etc., should not be used to create an inference that the alternative use of the articles "a" or "an" should be limited to a single component, element, etc.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:
1. A process for modifying hydroprocessing catalysts, the process comprising:
 introducing a precursor agent to a conversion reactor;
 introducing hydrogen gas into the conversion reactor;

contacting the precursor agent with a conversion catalyst in the conversion reactor, thereby producing an active agent;

introducing the active agent to a production reactor;

contacting the active agent with a hydroprocessing catalyst in the production reactor, thereby producing a modified hydroprocessing catalyst; wherein:
  the precursor agent is introduced to the conversion reactor as a liquid, and
  the active agent is introduced to the production reactor as a gas;

contacting the hydroprocessing catalyst with a hydrocarbon feedstock in the production reactor to produce an outlet; and separating the outlet of the production reactor into a liquid effluent and a gaseous effluent.

2. The process of claim 1, wherein the precursor agent comprises a sulfide precursor and the conversion catalyst comprises a sulfide conversion catalyst.

3. The process of claim 2, wherein the sulfide conversion catalyst comprises one or more of Co, Mo, W, Ni, and alumina.

4. The process of claim 2, wherein the sulfide precursor comprises one or more organic monosulfides or polysulfides.

5. The process of claim 2, wherein the precursor agent is disulfide oil (DSO).

6. The process of claim 1, wherein the precursor agent comprises an ammonia precursor and the conversion catalyst comprises an ammonia conversion catalyst.

7. The process of claim 6, wherein the ammonia conversion catalyst comprises one or more of Co, Mo, W, Ni, and alumina.

8. The process of claim 6, wherein the ammonia precursor comprises one or more organic compounds comprising nitrogen.

9. The process of claim 6, wherein the conversion catalyst has not been sulfided.

10. The process of claim 1, wherein the precursor agent comprises a sulfide precursor, further comprising:
  introducing an ammonia precursor to the conversion reactor;
  introducing hydrogen gas into the conversion reactor;
  contacting the ammonia precursor with the conversion catalyst in the conversion reactor, thereby producing an ammonia gas;
  introducing the ammonia gas to the production reactor; and
  contacting the ammonia gas with the modified hydroprocessing catalyst in the production reactor, thereby producing a sulfided and passivated hydroprocessing catalyst; wherein:
    the ammonia precursor is introduced to the conversion reactor as a liquid, and
    the ammonia gas is introduced to the production reactor as a gas.

11. The process of claim 1, further comprising introducing hydrogen gas into the production reactor.

12. The process of claim 1, further comprising introducing a hydrocarbon feedstock into the conversion reactor.

13. The process of claim 1, further comprising recycling at least a portion of the gaseous effluent back to the production reactor.

14. The process of claim 1, further comprising recycling at least a portion of the liquid effluent back to the production reactor.

15. The process of claim 1, wherein the hydroprocessing catalyst comprises alumina, silica-alumina, zeolite, or a combination thereof.

16. The process of claim 1, wherein the hydroprocessing catalyst comprises one or more of Mo, W, Co, or Ni.

17. The process of claim 1, further comprising continuing to introduce precursor agent into the conversion reactor after break-through has been achieved in the conversion reactor.

18. The process of claim 1, wherein a combined weight of all contaminants in the modified hydroprocessing catalyst is less than 1 wt. % of a total weight of the modified hydroprocessing catalyst.

19. The process of claim 1 further comprising contacting the modified hydroprocessing catalyst with a hydroprocessing substrate in a hydroprocessing process, wherein the hydroprocessing substrate does not contact the conversion catalyst.

* * * * *